United States Patent
Mizutani et al.

(10) Patent No.: US 7,789,178 B2
(45) Date of Patent: Sep. 7, 2010

(54) WHEEL SUPPORT DEVICE

(75) Inventors: Ryoji Mizutani, Nishikamo-gun (JP); Fumito Kurata, Toyota (JP); Shuuetsu Suzuki, Gamagori (JP); Junichiro Sakurai, Chiryu (JP)

(73) Assignees: Toyota Jidosha Kabushiki Kaisha, Toyota (JP); Aisin Seiki Kabushiki Kaisha, Kariya-shi (JP)

( * ) Notice: Subject to any disclaimer, the term of this patent is extended or adjusted under 35 U.S.C. 154(b) by 965 days.

(21) Appl. No.: 11/596,724

(22) PCT Filed: May 24, 2005

(86) PCT No.: PCT/JP2005/009841

§ 371 (c)(1),
(2), (4) Date: Nov. 16, 2006

(87) PCT Pub. No.: WO2005/115789

PCT Pub. Date: Dec. 8, 2005

(65) Prior Publication Data

US 2008/0017462 A1    Jan. 24, 2008

(30) Foreign Application Priority Data

May 25, 2004   (JP)   ............................. 2004-154679

(51) Int. Cl.
*B60K 1/00* (2006.01)
(52) U.S. Cl. .................. 180/65.51; 301/6.91
(58) Field of Classification Search ............. 180/65.51, 180/65.6, 65.7, 65.31; 301/6.91, 6.1, 5.304, 301/5.1
See application file for complete search history.

(56) References Cited

U.S. PATENT DOCUMENTS 2,955,841 A * 10/1960 Faiver et al. ................. 188/380
4,368,807 A * 1/1983 McLean et al. ............. 188/379

(Continued)

FOREIGN PATENT DOCUMENTS

JP          A 51-1877          1/1976

(Continued)

OTHER PUBLICATIONS

U.S. Appl. No. 11/579,417, filed Nov. 2, 2006 in the name of Shigekazu Yogo et al.

(Continued)

*Primary Examiner*—Hau V Phan
(74) *Attorney, Agent, or Firm*—Oliff & Berridge, PLC

(57) ABSTRACT

A wheel support device (200) includes a spring (302, 304) fitted to an in-wheel motor (70) and damping the vibration of a motor-driven wheel (100) and the in-wheel motor (70) by extending and retracting, a knuckle (180) attached to the spring (302, 304) and rotatably supporting the motor-driven wheel (100), a center part (306) of a dynamic mass damper mechanism (300) vibrating together with the in-wheel motor (70) by a force given from a road surface when a vehicle runs, an upper part (310) thereof restricting the vibration of the in-wheel motor (70) by coming into contact with the center part (306) at a prescribed region, and a cushioning member (322, 324) fitted to a portion of the center part (306) or the upper part (310) corresponding to the prescribed region brought into contact with the other.

14 Claims, 4 Drawing Sheets

U.S. PATENT DOCUMENTS

| | | | | |
|---|---|---|---|---|
| 4,991,698 | A * | 2/1991 | Hanson | 188/380 |
| 5,438,228 | A * | 8/1995 | Couture et al. | 310/67 R |
| 5,468,055 | A * | 11/1995 | Simon et al. | 301/6.91 |
| 5,509,492 | A * | 4/1996 | Pfannschmidt | 180/65.51 |
| 6,364,078 | B1 * | 4/2002 | Parison et al. | 188/380 |
| 7,556,112 | B2 * | 7/2009 | Suzuki et al. | 180/65.51 |
| 2004/0099455 | A1 | 5/2004 | Nagaya | |
| 2006/0048798 | A1 | 3/2006 | McCoy et al. | |

FOREIGN PATENT DOCUMENTS

| | | |
|---|---|---|
| JP | U 61-119643 | 7/1986 |
| JP | B2 4-52346 | 8/1992 |
| JP | A 7-81430 | 3/1995 |
| JP | A 11-170831 | 6/1999 |
| JP | A 2000-054506 | 2/2000 |
| JP | A 2001-315534 | 11/2001 |
| JP | A 2004-090699 | 3/2004 |
| JP | A 2004-122953 | 4/2004 |
| WO | WO 02/083446 A | 10/2002 |

OTHER PUBLICATIONS

G. Nagaya et al., "Development of an In-Wheel Motor with Advanced Dynamic-Damper Mechanism," Preprints of Meeting on Automotive Engineers, Nov. 26, 2002, No. 83-02, Society of Automotive Engineers of Japan, Inc., pp. 9-12.

* cited by examiner

F I G. 1
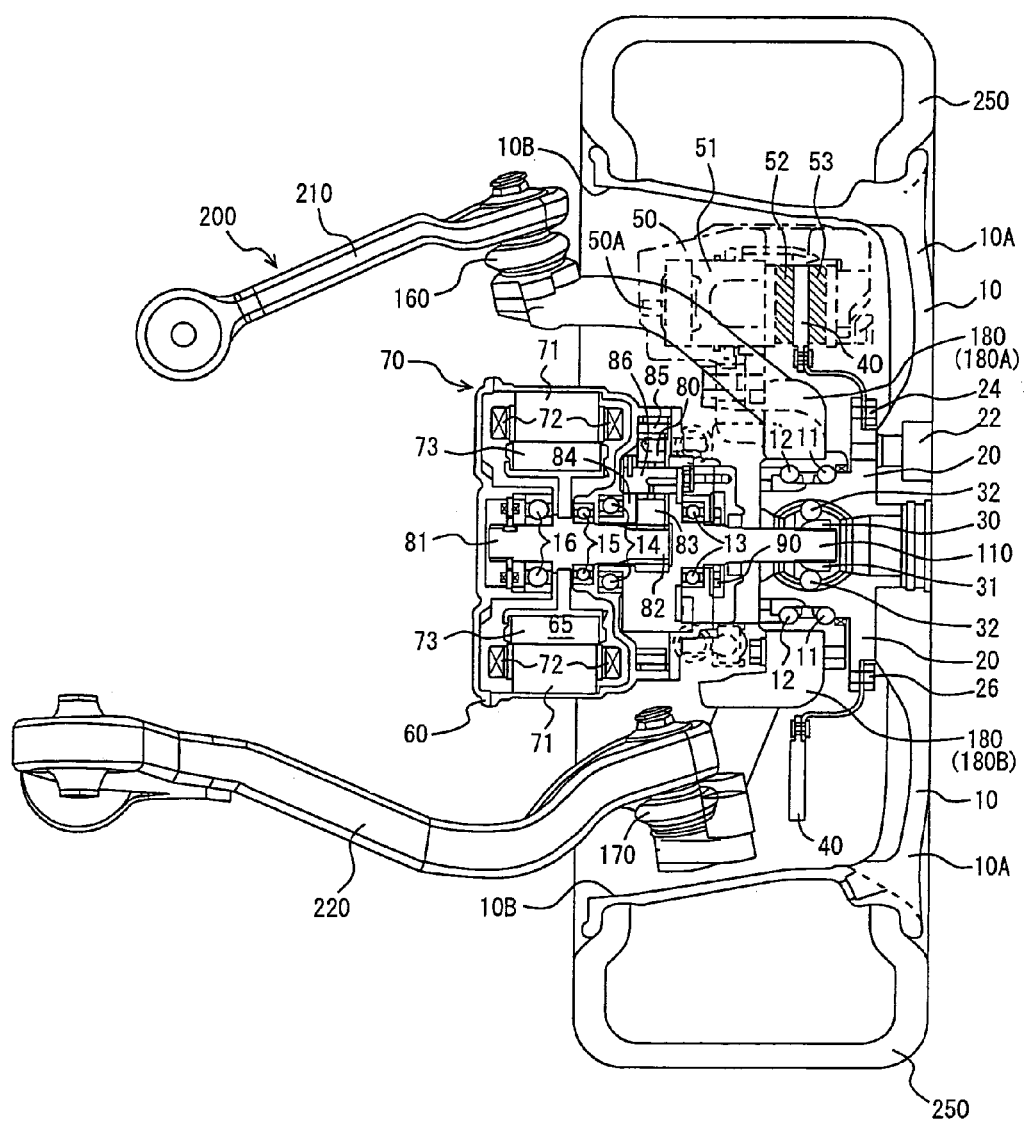

WHEEL SUPPORT DEVICE

TECHNICAL FIELD

The present invention relates to a wheel support device, and particularly to a wheel support device suppressing degradation in riding comfort of a vehicle.

BACKGROUND ART

In a conventional in-wheel motor driving system, a motor is disposed in an outer frame, and an output shaft of the motor is rotatably supported by the outer frame via a bearing. The output shaft has one end coupled to a wheel via a planetary gear.

Further, the outer frame housing the motor is coupled to a suspension arm via a ball joint. The suspension arm is coupled to the vehicle body via a shock absorber.

As such, in the conventional in-wheel motor driving system, the outer frame housing the motor is coupled to the vehicle body via the ball joint and the suspension arm.

As a conventional in-wheel motor driving system, one having a hollow motor supported by a motor suspension is known from Go Nagaya, Yasumichi Wakao, Akihiko Abe, "Development of an In-Wheel Motor with Advanced Dynamic-Damper Mechanism", Society of Automotive Engineers of Japan, Inc., Nov. 26, 2002, Preprints of Meeting on Automotive Engineers, No. 83-02, pp. 9-12. The hollow motor is coupled to a wheel, and rotates the wheel. The hollow motor is supported by the motor suspension in a manner capable of vibrating in the up-and-down direction of the vehicle, and is separated from the unsprung mass. The wheel is supported by the suspension arm at the vehicle body. In this in-wheel motor driving system, when the wheel vibrates, the vibration is transmitted from the wheel to the hollow motor, so that the hollow motor comes to vibrate in the up-and-down direction of the vehicle. Such vibration of the hollow motor reduces the vibration of the unsprung components transmitted to the vehicle.

In the in-wheel motor driving system disclosed in the above document, however, the outer frame housing the motor is supported by the suspension, and thus, the wheel may receive unexpectedly large external force depending on the road conditions and the like. When such unexpectedly large external force is input to the wheel, the outer frame may come into contact with other components such as a knuckle and the like. If the outer frame comes into contact with the other components, sound and impact will be transmitted to the vehicle body, leading to degradation in riding comfort of the vehicle.

DISCLOSURE OF THE INVENTION

An object of the present invention is to provide a wheel support device that suppresses degradation in riding comfort of a vehicle.

A wheel support device according to an aspect of the present invention supports a motor generating motive power, a wheel, and a motive power transmitting mechanism connected to an output shaft of the motor and transmitting the motive power to the wheel. The wheel support device includes: a resilient member fitted to the motor and damping vibration of the wheel and the motor by extending and retracting; a rotary support member attached to the resilient member and rotatably supporting the wheel; a vibrating member vibrating together with the motor by a force received from a road surface when a vehicle runs; a restricting member restricting the vibration of the motor by coming into contact with the vibrating member at a prescribed region; and a cushioning member provided at a portion of one of the vibrating member and the restricting member corresponding to the prescribed region brought into contact with the other.

According to the invention, the wheel support device includes a vibrating member (e.g., a part on the motor side) that vibrates together with the motor by the force received from the road surface at the time of running of the vehicle, a restricting member (e.g., a part on the knuckle side) that restricts the vibration of the motor by coming into contact with the vibrating member at a prescribed region, and a cushioning member that is provided at a portion of the vibrating member or the restricting member corresponding to the prescribed region where they come into contact with each other. At the time of running of a vehicle having a so-called dynamic mass damper mechanism where the motor is supported by the resilient member, when the vehicle receives force from the road surface, the motor vibrates alongwith the vibration of the wheel. At this time, even if the motor largely vibrates as unexpected external force is applied to the wheel or the like, contact between the motor and a rotary support member (e.g., knuckle) due to the vibration can be prevented, since a cushioning member is provided at a portion corresponding to the prescribed region where the vibrating member and the restricting member come into contact with each other. This can suppress degradation in riding comfort of the vehicle in the case where the motor largely vibrates. Accordingly, it is possible to provide a wheel support device capable of suppressing degradation in riding comfort of the vehicle. Further, since the contact of the motor with the knuckle can be prevented, it is possible to lower the strength of the enclosure of the motor compared to the case where no cushioning member is provided. This leads to downsizing of the motor or reduction of cost.

Preferably, the wheel support device further includes a vibration damping mechanism damping vibration of the resilient member. The vibration damping mechanism restricts extension and retraction oft eh resilient member.

According to this invention, the wheel support device further includes a vibration damping mechanism (e.g., absorber) damping vibration of the resilient member. The vibration damping mechanism restricts extension and retraction of the resilient member. As such, when the motor largely vibrates due to unexpected external force applied to the wheel or the like, the vibration damping mechanism can restrict extension and retraction of the resilient member due to the vibration of the motor. This can prevent contact between the motor and the knuckle due to the vibration. Accordingly, it is possible to suppress degradation in riding comfort of the vehicle.

Further, preferably, the cushioning member is provided at a region on an orbit of the vibration of the vibrating member at which the vibrating member and the restricting member come into contact with each other.

According to this invention, the cushioning member is provided at a region on an orbit of the vibration of the vibrating member (e.g., a part on the motor side) at which the vibrating member and the restricting member (e.g., a part on the knuckle side) come into contact with each other. In the vehicle having a so-called dynamic mass damper mechanism in which the motor is supported by a resilient member, when force is received from the road surface at the time of running of the vehicle, the motor vibrates along with the vibration of the wheel. At this time, even if the motor largely vibrates due to unexpected external force applied to the wheel, contact of the motor with the knuckle can be prevented, since the cushioning member is provided on an orbit of vibration of the part on the motor side at the region that is brought into contact with the part of the knuckle side. Accordingly, it is possible to suppress degradation in riding comfort of the vehicle at the time when the motor largely vibrates.

Further, preferably, the cushioning member is provided at the rotary support member.

According to this invention, the cushioning member is provided at the rotary support member (e.g., knuckle). By providing the cushioning members on the knuckle side rather than on the motor side in which there are a larger number of regions coming into contact with the knuckle due to the vibration, it is possible to provide the cushioning members at a required minimum number of regions. This can restrict an increase of cost.

Further, preferably, the cushioning member is a member absorbing an impact due to the vibration of the motor.

According to this invention, the cushioning member is a member that absorbs an impact due to the vibration of the motor. As such, even if the motor comes into contact with the knuckle due to the vibration, the impact due to the vibration of the motor can be absorbed by the cushioning member. Accordingly, it is possible to suppress degradation in riding comfort of the vehicle.

Further, preferably, the resilient member is formed of a pair of resilient members arranged in a vertical direction. One of the pair of resilient members is coupled to an upper part of the rotary support member, and the other one of the pair of resilient members is coupled to a lower part of the rotary support member.

According to this invention, the resilient member is formed of a vertically arranged pair of resilient members, and one of the pair of resilient members is coupled to an upper part of the rotary support member. As such, the wheel support device having the resilient members coupled to the upper part and the lower part of the rotary support member can be provided with the cushioning member that absorbs an impact due to contact of the vibrating member (e.g., a part on the motor side) with the restricting member (e.g., a part on the knuckle side). Accordingly, it is possible to suppress degradation in riding comfort of the vehicle even if unexpected external force is applied.

Further, preferably, the motive power transmitting mechanism is a constant velocity joint.

According to this invention, the motive power transmitting mechanism is a constant velocity joint. When external force is applied to the wheel, the motor vibrates in the up-and-down direction of the vehicle via the constant velocity joint. As such, by providing the cushioning member on an orbit of the vibration of the motor so as to prevent contact with the knuckle, it is possible to suppress degradation in riding comfort of the vehicle even if unexpected external force is applied.

Further, preferably, the motive power transmitting mechanism is a flexible coupling.

According to this invention, the motive power transmitting mechanism is a flexible coupling. When external force is applied to the wheel, the motor vibrates in the up-and-down direction via the flexible coupling. Thus, by providing the cushioning member on the orbit of the vibration in the up-and-down direction to prevent contact with the knuckle, degradation in riding comfort of the vehicle can be suppressed even if unexpected external force is applied.

BRIEF DESCRIPTION OF THE DRAWINGS

FIG. 1 is a (first) diagram showing a cross section of a wheel support device according to a first embodiment.

BEST MODES FOR CARRYING OUT THE INVENTION

Figure 2:
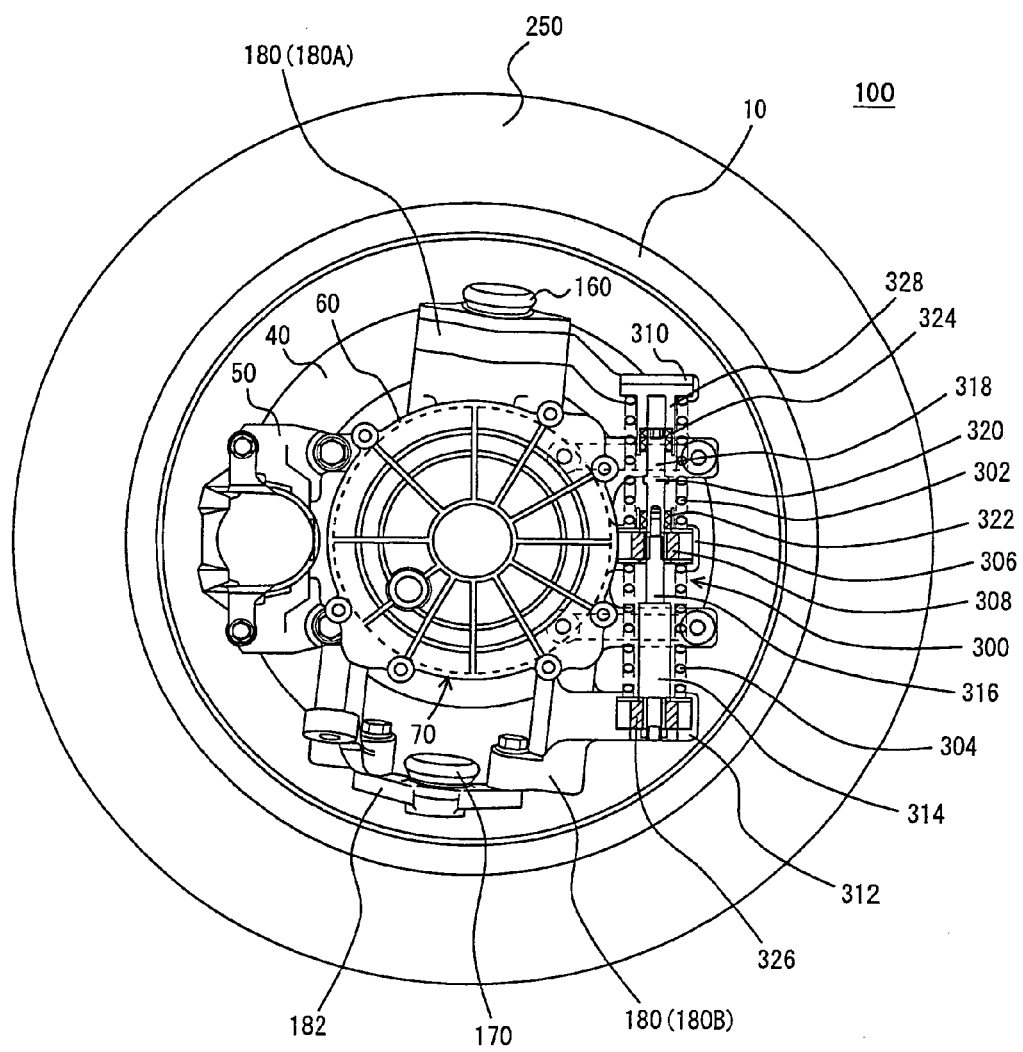
FIG. 2 is a diagram showing an appearance of the wheel support device of the first embodiment as seen from the direction of the rotation shaft of the motor.

Hereinafter, wheel support devices according to the embodiments of the present invention will be described with reference to the drawings. In the following, the same parts have the same reference characters allotted, and their names and functions are also the same. Therefore, detailed description thereof will not be repeated.

To describe the wheel support devices of the embodiments, firstly, description will be made about a configuration of a motor-driven wheel having an in-wheel motor supported by the wheel support devices.

First Embodiment

As shown in FIG. 1, a motor-driven wheel 100 supported by a wheel support device 200 according to a first embodiment of the present invention is formed with a wheel disk 10, a wheel hub 20, a constant velocity joint 30, a brake rotor 40, a brake caliper 50, an in-wheel motor 70, and a tire 250.

In-wheel motor 70 is formed with a case 60, a motor 65, a planetary gear 80, an oil pump 90, a shaft 1 10, and an oil passage (not shown).

Wheel support device 200 is formed with a dynamic mass damper mechanism (not shown), ball joints 160, 170, a knuckle 180, an upper arm 210, a lower arm 220, and a shock absorber (not shown).

Wheel disk 10 has an approximately cup shape, and is formed with a disk portion 10A and a rim portion 10B. Wheel disk 10 may be configured to accommodate wheel hub 20, brake rotor 40, brake caliper 50, and in-wheel motor 70. Wheel disk 10 is coupled to wheel hub 20 by fastening disk portion 10A to wheel hub 20 by a bolt or a nut (not shown) at a wheel attachment portion 22. Wheel hub 20 contains constant velocity joint 30 therein, and is coupled to shaft 110 via constant velocity joint 30 thus contained. Wheel hub 20 is rotatably supported by knuckle 180 via bearings 11, 12. Tire 250 is secured to an outer edge of rim portion 10B of wheel disk 10.

Constant velocity joint 30 includes an inner 31 and balls 32. Inner 31 is fitted to shaft 110. Balls 32 mate with a groove of wheel hub 20 and a groove of inner 31 provided in the direction of the rotational axis of shaft 110, and causes wheel hub 20 to rotate in association with rotation of shaft 110. Further, balls 32 are movable in the direction of the rotational axis of shaft 110 along the grooves provided at wheel hub 20 and inner 31. It is noted that constant velocity joint 30 is not particularly restricted, as long as it constitutes a motive power transmitting mechanism that transmits motive power of in-wheel motor 70 to wheel disk 10. For example, a so-called flexible coupling may be used, wherein a plurality of disks and the like are used to connect the in-wheel motor side and the wheel side in a manner allowing eccentricity in any direction.

Brake rotor 40 is arranged such that its inner peripheral end is secured to an outer peripheral end of wheel hub 20 by bolts 24, 26, and its outer peripheral end passes through brake caliper 50. Brake caliper 50 is secured to knuckle 180. Brake caliper 50 includes a brake piston 51 and brake pads 52, 53. The outer peripheral end of brake rotor 40 is sandwiched between brake pads 52, 53.

When brake oil is supplied from an opening 50A, brake piston 51 moves to the right in the paper plane of FIG. 1, to press brake pad 52 to the right in the paper plane. When brake pad 52 is moved to the right in the paper plane by brake piston 51, in response, brake pad 53 moves to the left in the paper plane. As such, brake pads 52, 53 pinch the outer peripheral end of brake rotor 40, whereby the brake is applied to motor-driven wheel 100.

Case 60 is arranged to the left of wheel hub 20 in the paper plane of FIG. 1. Case 60 accommodates motor 65, planetary gear 80, oil pump 90, shaft 110, and the oil passage.

Motor 65 includes a stator core 71, a stator coil 72, and a rotor 73. Stator core 71 is secured to case 60. Stator coil 72 is wound around stator core 71. When motor 65 is a three-phase motor, stator coil 72 is composed of U-phase coil, V-phase coil and W-phase coil. Rotor 73 is arranged on the inner peripheral side of stator core 71 and stator coil 72.

Planetary gear 80 includes a sun gear shaft 81, a sun gear 82, a pinion gear 83, a planetary carrier 84, a ring gear 85, and a pin 86. Sun gear shaft 81 is coupled to rotor 73 of motor 65. Sun gear shaft 81 is rotatably supported by bearings 15, 16. Sun gear 82 is coupled to sun gear shaft 81.

Pinion gear 83 mates with sun gear 82, and is rotatably supported by a bearing arranged on the outer periphery of pin 86. Planetary carrier 84 is coupled to pinion gear 83, and is connected to shaft 110. Planetary carrier 84 and shaft 110 connected to planetary carrier 84 are rotatably supported by bearings 13, 14. Ring gear 85 is secured to case 60. Pin 86 is supported at planetary carrier 84.

Oil pump 90 is provided at an end of in-wheel motor 70 on the wheel hub 20 side, while being connected to shaft 110. Shaft 110 is connected to inner 31 of constant velocity joint 30 and to planetary carrier 84, as described above, and is rotatably supported by bearings 13, 14.

The oil passage is provided at case 60. The oil passage has one end coupled to oil pump 90 and the other end inserted into an oil sump (not shown).

Oil pump 90 pumps up, via the oil passage, the oil accumulated in the oil sump in association with rotation of shaft 1 10, and circulates the pumped-up oil within case 60.

As shown in FIG. 2, dynamic mass damper mechanism 300 is formed with springs 302, 304 identified as a pair of resilient members provided in the up-and-down direction of the vehicle. Dynamic mass damper mechanism 300 has its center part 306 attached to the outer peripheral side surface of case 60 of in-wheel motor 70. In the present embodiment, for example, center part 306 of dynamic mass damper mechanism 300 is attached to case 60 at a position on the rear side of the vehicle and at the same level as the rotation shaft of in-wheel motor 70. Dynamic mass damper mechanism 300 has its upper part 310 connected to knuckle 180 (180A). Upper part 310 and center part 306 are connected via spring 302. Dynamic mass damper mechanism 300 has its lower part 312 connected to knuckle 180 (180B). Lower part 312 and center part 306 are connected via spring 304.

Further, an absorber 314 is provided between upper part 310 and lower part 312, to penetrate through center part 306. Absorber 314 includes shafts 316, 318. Absorber 314 restricts up and down vibration of shafts 316, 318. Shaft 316 has one end connected to one end of shaft 318. Shaft 318 has the other end fitted to an opening 328 provided at upper part 310, and slides inside opening 328 in accordance with changes in shape of springs 362, 304. Shaft 316 penetrating through center part 306 has its horizontal position restricted by a bush 308. A lower end of absorber 314 has its horizontal position restricted by a bush 326.

Knuckle 180 (180A) has one end coupled to ball joint 160 and the other end coupled to wheel hub 20 via bearings 11, 12. At the bottom of knuckle 180 (180B), a plate 182 is secured by a bolt. Ball joint 170 is coupled to plate 182.

Figure 3:
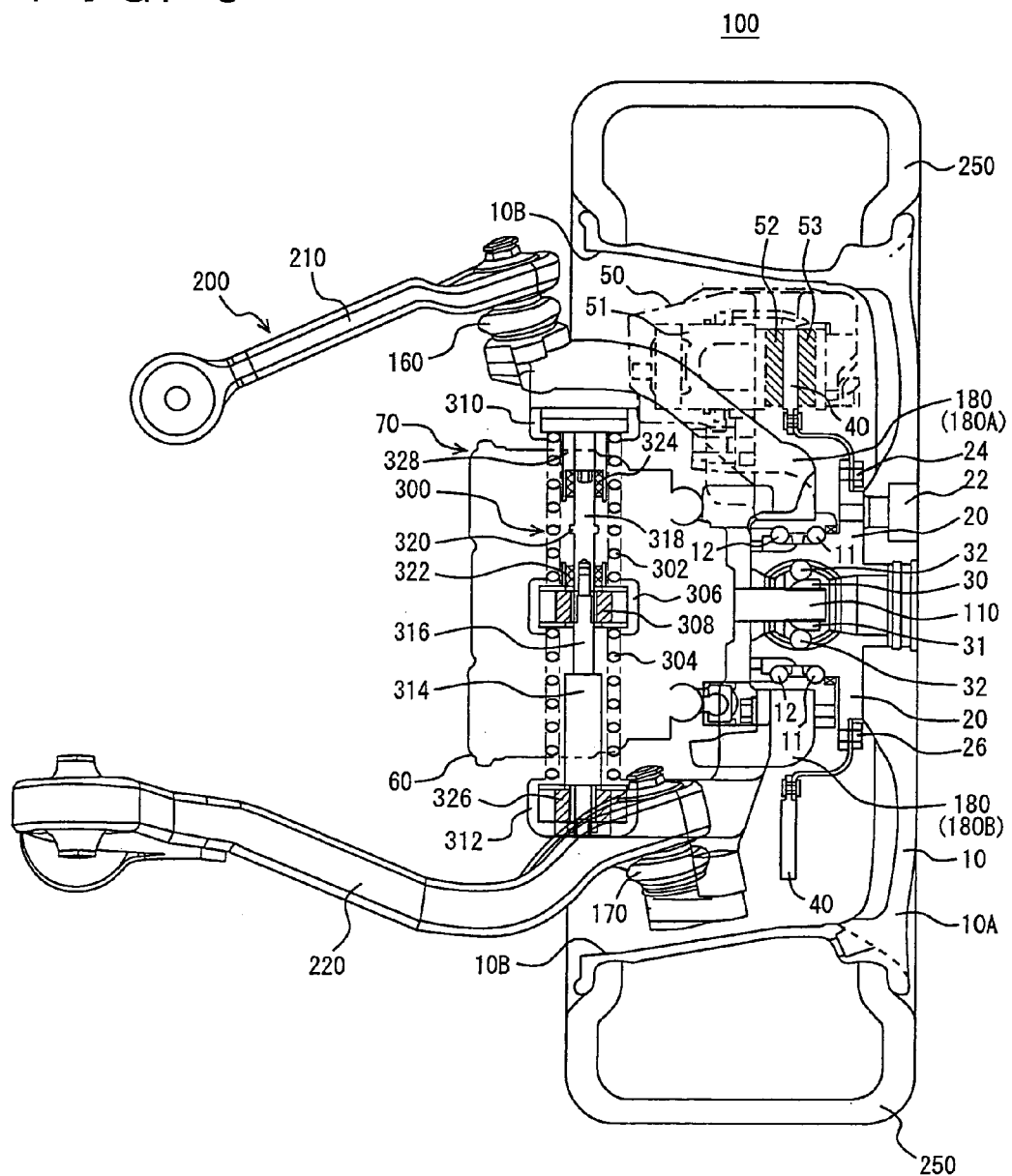
FIG. 3 is a (second) diagram showing a cross section of the wheel support device of the first embodiment.

As shown in FIG. 3, upper arm 210 and lower arm 220 are arranged in the up-and-down direction of the vehicle. Upper arm 210 has one end coupled to ball joint 160, and the other end secured to the vehicle body in a manner allowing turning in the up-and-down direction of the vehicle. Lower arm 220 has one end coupled to ball joint 170, and the other end secured to the vehicle body in a manner allowing turning in the up-and-down direction of the vehicle. Further, lower arm 220 is coupled to the vehicle body via a shock absorber. As such, motor-driven wheel 100 is suspended from the vehicle.

In this manner, upper arm 210 and lower arm 220 are coupled to knuckle 180 via ball joints 160 and 170, respectively, from the upper and lower directions of the vehicle.

Knuckle 180 is coupled with one end of a steering tie rod (not shown). The steering tie rod turns motor-driven wheel 100 to the right or left with respect to the traveling direction of the vehicle, in accordance with the turning force from the steering (steering wheel) of the vehicle.

Since upper arm 210 and lower arm 220 are secured to the vehicle body in a manner allowing turning in the up-and-down direction of the vehicle, and lower arm 220 is coupled to the vehicle body via the shock absorber, upper arm 210, lower arm 220 and the shock absorber function as suspension.

Dynamic mass damper mechanism 300 is secured to case 60 of in-wheel motor 70. Dynamic mass damper mechanism 300 is also coupled to knuckle 180. Wheel support device 200 supports motor-driven wheel 100 at the vehicle by coupling the suspension arms (upper arm 210 and lower arm 220) to knuckle 180 via ball joints 160 and 170.

More specifically, wheel support device 200 rotatably supports wheel disk 10 and wheel hub 20 by means of upper arm 210, lower arm 220 and knuckle 180, and supports in-wheel motor 70 in a manner allowing vibration in the up-and-down direction of the vehicle by means of upper arm 210, lower arm 220 and dynamic mass damper mechanism 300.

Further, when an alternating current is supplied to stator coil 72 by a switching circuit (not shown) incorporated in the vehicle, rotor 73 rotates, and motor 65 outputs prescribed torque. The output torque of motor 65 is transmitted via sun gear shaft 81 to planetary gear 80. Planetary gear 80 uses sun gear 82 and pinion gear 83 to change the output torque received from sun gear shaft 81, i.e., changes (reduces) the speed, and outputs the resultant torque to planetary carrier 84. Planetary carrier 84 transmits the output torque of planetary gear 80 to shaft 110, and shaft 110 rotates wheel hub 20 and wheel disk 10 at a prescribed revolution speed via constant velocity joint 30. This causes motor-driven wheel 100 to rotate at the prescribed revolution speed, so that the vehicle runs.

During the running of the vehicle, when motor-driven wheel 100 receives vibration in the up-and-down direction of the vehicle in response to the road conditions and the like, springs 302, 304 of dynamic mass damper mechanism 300 extend and retract in the up-and-down direction of the vehicle by in-wheel motor 70 that serves as a damper mass. With extension and retraction of springs 302, 304, there occurs vibration in the up-and-down direction of in-wheel motor 70 that is out of phase with the vibration due to the force received from the road surface by motor-driven wheel 100. That is, dynamic mass damper mechanism 300 converts the vibration of motor-driven wheel 100 to the vibration of in-wheel motor 70. At this time, vibration as a combination of the vibration of motor-driven wheel 100 and the vibration of in-wheel motor 70 out of phase with the vibration of motor-driven wheel 100 is transmitted to the vehicle body. Since the vibration of motor-driven wheel 100 and the vibration of in-wheel motor 70 are out of phase, the amplitude of the vibration of motor-driven wheel 100 is decreased by the amplitude of the vibration of in-wheel motor 70 that is out of phase. In other words, with the vibration of in-wheel motor 70, the vibration of motor-driven wheel 100 becomes less likely to be transmitted to the vehicle body via upper arm 210 and lower arm 220.

In-wheel motor 70 vibrates in the up-and-down direction via constant velocity joint 30. More specifically, in-wheel motor 70 vibrates, with constant velocity joint 30 as the center of rotation, to draw an arc in the up-and-down direction of the vehicle. At this time, the vibration of in-wheel motor 70 in the horizontal direction is absorbed by bushes 308 and 326 provided at dynamic mass damper mechanism 300. Meanwhile, the vibration of in-wheel motor 70 in the up-and-down direction caused by extension and retraction of springs 302, 304 is damped by absorber 314.

As described above, the input from tire 250 to the unsprung components is alleviated. More specifically, when motor-driven wheel 100 receives vibration during the running of the vehicle in accordance with the road conditions and the like, the vibration that cannot be absorbed by the shock absorber provided at the suspension is absorbed by dynamic mass damper mechanism 300. Dynamic mass damper mechanism 300 causes in-wheel motor 70 to vibrate in the up-and-down direction of the vehicle by the vibration received by motor-driven wheel 100, with the phase being shifted. Eventually, dynamic mass damper mechanism 300 does not transmit large vibration to the vehicle body which is sprung. This leads to improvement in riding comfort of the vehicle incorporating the wheel driven by in-wheel motor 70.

Here, if unexpected external force is applied to motor-driven wheel 100, in-wheel motor 70 largely vibrates. Largely vibrating in-wheel motor 70 may come into contact with knuckle 180. When the vibrating in-wheel motor 70 comes into contact with knuckle 180, the force received from the road surface cannot be absorbed by in-wheel motor 70 alone, in which case large vibration will be transmitted to the vehicle body. This may lead to degradation in riding comfort.

Thus, wheel support device 200 of the present invention is characterized in that it includes a vibrating member that vibrates together with the vibration of in-wheel motor 70, a restricting member that restricts the vibration of the motor by coming into contact with the vibrating member at a prescribed region, and a cushioning member that is arranged at a portion of the vibrating member or the restricting member corresponding to the prescribed region at which they come into contact with each other.

More specifically, absorber 314 has a protruding portion 320 that protrudes around the shaft 318. At shaft 318, a cushioning member 322 absorbing an impact of vibration in the downward direction of protruding portion 320 is provided on the center part 306 side. Meanwhile, at opening 328 provided on the upper part 310 side and one end of shaft 318 slides within, a cushioning member 324 absorbing an impact of vibration in the upward direction of protruding portion 320 is provided. Cushioning members 322 and 324 are separate from each other by a predetermined distance. Although the predetermined distance is not particularly limited, it is set for example in accordance with the amounts of extension and retraction of springs 302 and 304. That is, cushioning members 322 and 324 restrict the amounts of extension and retraction of springs 302 and 304 so that at least in-wheel motor 70 does not come into contact with knuckle 180.

Further, cushioning members 322, 324 are not particularly limited, as long as they are each a member formed of rubber or the like that can absorb the impact when it comes into contact with protruding portion 320 due to the vibration of shaft 318. It is noted that the unexpectedly large external force refers to the external force motor-driven wheel 100 would receive from the road surface for example when the vehicle goes over a bump during the running at high speed, or when the vehicle goes over a large bump even during the running at low speed.

Wheel disk 10 and wheel hub 20 constitute the "wheel". Springs 302 and 304 constitute "a pair of resilient members arranged in the vertical direction". In the present embodiment, the vertically arranged pair of resilient members are coupled to upper arm 210 and lower arm 220, respectively. Further, knuckle 180 constitutes the "rotary support member" that rotatably supports the wheel (wheel disk 10 and wheel hub 20). Constant velocity joint 30 constitutes the "motive power transmitting mechanism" that is connected to the output shaft of in-wheel motor 70 and transmits the motive power generated by in-wheel motor 70 to the wheel (wheel disk 10 and wheel hub 20). Center part 306 constitutes the "vibrating member", and upper part 310 constitutes the "restricting member".

The function of wheel support device 200 according to the present embodiment based on the above-described structure will now be described.

When unexpectedly large external force is applied to motor-driven wheel 100, in-wheel motor 70 vibrates in accordance with the vibration of motor-driven wheel 100. In dynamic mass damper mechanism 300, springs 302, 304 extend and retract in accordance with the vibration of in-wheel motor 70. With the extension and retraction of springs 302 and 304, shafts 316 and 318 vibrate in the up-and-down direction. At this time, when one end of shaft 318 slides inside opening 328 and spring 302 retracts and spring 304 extends, protruding portion 320 provided at shaft 318 comes into contact with cushioning member 324. On the other hand, when spring 302 extends and spring 304 retracts, protruding portion 320 comes into contact with cushioning member 322. Absorber 314 comes to function when protruding portion 320 contacts either one of cushioning members 322 and 324. That is, it restricts the vibration of shafts 316, 318 and damps the vibration of springs 302, 304, i.e., the vibration of in-wheel motor 70. At this time, the vibration of in-wheel motor 70 is absorbed by absorber 314 and cushioning members 322, 324.

As described above, according to the wheel support device of the present embodiment, the cushioning members are provided at the portions corresponding to a prescribed region where the part on the in-wheel motor side and the part on the knuckle side come into contact with each other, and therefore, the contact between the motor and the knuckle due to the vibration can be prevented even when the motor largely vibrates as the unexpected external force is applied to the wheel or the like. This can suppress degradation in riding comfort of the vehicle when the motor largely vibrates. Accordingly, it is possible to provide a wheel support device that suppresses degradation in riding comfort of the vehicle. Further, since the contact of the motor with the knuckle can be prevented, the strength of the enclosure of the motor can be reduced compared to the case where there is no cushioning member. This can downsize the motor or reduce the cost.

Second Embodiment

A wheel support device according to a second embodiment of the present invention will now be described. Compared to the configuration of wheel support device 200 according to the first embodiment described above, the wheel support device according to the present embodiment differs in the configuration of absorber 314 and also differs in that it includes cushioning members 332 and 334 instead of cushioning members 322 and 324. Otherwise, the configuration is identical to that of wheel support device 200 according to the first embodiment described above. They are denoted by the same reference characters, and their functions are identical. Thus, detailed description thereof will not be repeated here.

The wheel support device 200 according to the present invention is characterized in that it includes a case 60 that vibrates together with the vibration of in-wheel motor 70, a knuckle 180 that restricts the vibration of the motor by coming into contact with case 60 at a prescribed region, and cushioning members 332, 334 that are each provided at a portion of case 60 or knuckle 180 corresponding to the prescribed region where they come into contact with each other.

Figure 4:
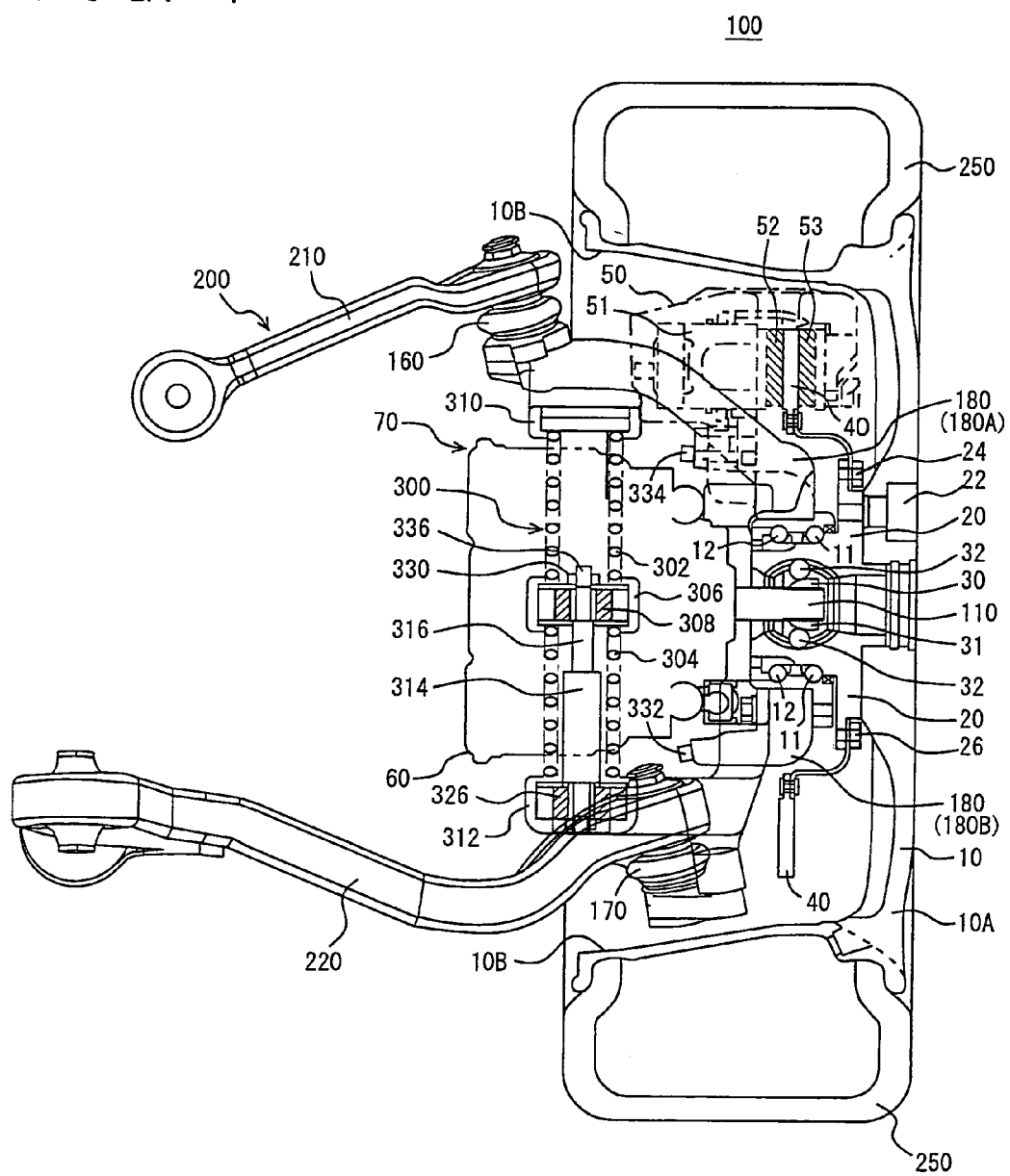
FIG. 4 is a diagram showing a cross section of a wheel support device according to a second embodiment.

More specifically, case 60 makes an arc movement in the up-and-down direction of the vehicle, with constant velocity joint 30 as the center of rotation, as shown in FIG. 4. Cushioning members 332, 334 are provided on the orbit of the arc movement and at the regions coming into contact with knuckle 180. Absorber 314 includes shaft 316 having one end 336 secured to the center part 306. It is noted that cushioning members 332, 334 are not particularly restricted, as long as they are each a member formed of rubber or the like that can absorb an impact when case 60 comes into contact with knuckle 180 due to vibration.

The function of wheel support device 200 according to the present embodiment based on the above-described structure will now be described.

When unexpectedly large external force is applied to motor-driven wheel 100, in-wheel motor 70 vibrates in accordance with the vibration of motor-driven wheel 100. In dynamic mass damper mechanism 300, springs 302, 304 extend and retract in accordance with the vibration of in-wheel motor 70. Shaft 316 of absorber 314 vibrates in the up-and-down direction along with the extension and retraction of spring 304. At this time, in-wheel motor 70 vibrates largely, and comes into contact with the upper part or the lower part of knuckle 180. The impact however is absorbed by cushioning members 332, 334, since cushioning members 332, 334 are provided at the regions where in-wheel motor 70 and knuckle 180 contact each other.

In the present embodiment, case 60 constitutes the "vibrating member". The regions at the upper part and the lower part of knuckle 180 where cushioning members 332, 334 are provided constitute the "restricting members".

As described above, according to the wheel support device of the present embodiment, when the motor largely vibrates due to application of unexpected external force to the wheel or the like, the contact of the motor with the knuckle can be avoided by the cushioning member provided on the orbit of the motor at the region coming into contact with the knuckle. This can suppress degradation in riding comfort of the vehicle at the time when the motor largely vibrates. Accordingly, it is possible to provide a wheel support device that suppresses degradation in riding comfort of the vehicle. Further, since the contact of the motor with the knuckle can be prevented, the strength of the enclosure of the motor can be reduced compared to the case where there is no cushioning member. This enables downsizing of the motor or reduction of the cost.

It is noted that the cushioning member is preferably provided at the knuckle. By providing the cushioning member at the knuckle side instead of the motor side where a larger number of regions come into contact with the knuckle due to the vibration, the cushioning members can be provided at a required minimum number of regions. This can restrict an increase of cost.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A wheel support device supporting a motor generating motive power, a wheel, and a motive power transmitting mechanism connected to an output shaft of said motor and transmitting said motive power to said wheel, comprising:
    a resilient member fitted to said motor and damping vibration of said wheel and said motor by extending and retracting;
    a rotary support member attached to said resilient member and rotatably supporting said wheel;
    a vibrating member vibrating together with said motor by a force received from a road surface when a vehicle runs;
    a restricting member restricting the vibration of said motor by coming into contact with said vibrating member at a prescribed region;
    a vibration damping mechanism connected to said vibrating member and said rotary support member and damping vibration of said resilient member to restrict extension and retraction of said resilient member; and
    a cushioning member provided at a portion of one of said vibrating member and said restricting member corresponding to said prescribed region brought into contact with the other, wherein
    said cushioning member corresponds to rubber members provided at said vibration damping mechanism, one on the side of said vibrating member and one on the side of said restricting member, spaced apart from each other.

2. The wheel support device according to claim 1, wherein said cushioning member is provided at a region on an orbit of the vibration of said vibrating member at which said vibrating member and said restricting member come into contact with each other.

3. The wheel support device according to claim 1, wherein said cushioning member is provided at said rotary support member.

4. The wheel support device according to claim 1, wherein said cushioning member is a member absorbing an impact due to the vibration of said motor.

5. The wheel support device according to claim 1, wherein said resilient member is formed of a pair of resilient members arranged in a vertical direction,
    one of said pair of resilient members is coupled to an upper part of said rotary support member, and
    the other one of said pair of resilient members is coupled to a lower part of said rotary support member.

6. The wheel support device according to claim 1, wherein said motive power transmitting mechanism is a constant velocity joint.

7. The wheel support device according to claim 1, wherein said motive power transmitting mechanism is a flexible coupling.

8. A wheel support device supporting a motor generating motive power, a wheel, and a motive power transmitting mechanism connected to an output shaft of said motor and transmitting said motive power to said wheel, comprising:
- a resilient member fitted to said motor and damping vibration of said wheel and said motor by extending and retracting;
- a rotary support member attached to said resilient member and rotatably supporting said wheel;
- a vibrating member vibrating together with said motor by a force received from a road surface when a vehicle runs;
- a restricting member restricting the vibration of said motor by coming into contact with said vibrating member at a prescribed region;
- a vibration damping mechanism connected to said vibrating member and said rotary support member and damping vibration of said resilient member to restrict extension and retraction of said resilient member; and
- a cushioning member provided at a portion of one of said vibrating member and said restricting member corresponding to said prescribed region brought into contact with the other, wherein said cushioning member corresponds to a rubber member provided at said rotary support member on an orbit of vibration of said vibrating member and spaced apart from said vibrating member to have a gap therebetween, and absorbing an impact in a left-and-right direction and a back-and-force direction of said wheel in addition to the up-and-down direction of said wheel.

9. The wheel support device according to claim 8, wherein said cushioning member is provided at a region on an orbit of the vibration of said vibrating member at which said vibrating member and said restricting member come into contact with each other.

10. The wheel support device according to claim 8, wherein said cushioning member is provided at said rotary support member.

11. The wheel support device according to claim 8, wherein said cushioning member is a member absorbing an impact due to the vibration of said motor.

12. The wheel support device according to claim 8, wherein
- said resilient member is formed of a pair of resilient members arranged in a vertical direction,
- one of said pair of resilient members is coupled to an upper part of said rotary support member, and
- the other one of said pair of resilient members is coupled to a lower part of said rotary support member.

13. The wheel support device according to claim 8, wherein said motive power transmitting mechanism is a constant velocity joint.

14. The wheel support device according to claim 8, wherein said motive power transmitting mechanism is a flexible coupling.

* * * * *